US007537138B2

(12) United States Patent  
Saggin et al.

(10) Patent No.: US 7,537,138 B2
(45) Date of Patent: May 26, 2009

(54) METHODS AND SYSTEMS FOR DELIVERING FOAMED BEVERAGES FROM LIQUID CONCENTRATES

(75) Inventors: Rafaella Saggin, New Milford, CT (US); Martin Leser, Bretigny s/Morrens (CH); Jean-Baptiste Bezelgues, Epalinges (CH); Simon Livings, Savigny (CH); Alexander A. Sher, Danbury, CT (US)

(73) Assignee: Nestec S.A., Vevey (CH)

( * ) Notice: Subject to any disclaimer, the term of this patent is extended or adjusted under 35 U.S.C. 154(b) by 533 days.

(21) Appl. No.: 11/156,922

(22) Filed: Jun. 20, 2005

(65) Prior Publication Data

US 2006/0283884 A1  Dec. 21, 2006

(51) Int. Cl.
    *B67D 5/56* (2006.01)
(52) U.S. Cl. .............................. 222/1; 99/283; 99/287; 222/129.4; 426/569; 426/590
(58) Field of Classification Search ............... 222/129.4, 222/1; 99/283, 287; 426/569, 590
    See application file for complete search history.

(56) References Cited

U.S. PATENT DOCUMENTS

| 240,829 | A |   | 5/1881  | Kimball |
| 947,334 | A |   | 1/1910  | Holnagel |
| 2,612,304 | A | * | 9/1952  | Nissen ....................... 99/323.2 |
| 2,812,879 | A | * | 11/1957 | Arnett ......................... 406/120 |
| 2,949,993 | A | * | 8/1960  | Adler ........................... 194/243 |
| 3,160,318 | A | * | 12/1964 | Steiner et al. .................. 222/43 |
| 3,236,270 | A | * | 2/1966  | Stutz ........................... 141/104 |
| 3,335,753 | A | * | 8/1967  | Kiser ...................... 137/624.11 |
| 3,378,170 | A | * | 4/1968  | Reynolds et al. ......... 222/129.4 |
| 3,385,569 | A | * | 5/1968  | Bookout ................... 366/165.1 |
| 3,794,149 | A | * | 2/1974  | Syverson ..................... 194/245 |
| 3,844,447 | A | * | 10/1974 | Marsberg ................. 222/129.4 |
| 3,872,781 | A | * | 3/1975  | Helbling ....................... 99/282 |
| 3,985,267 | A | * | 10/1976 | Selvia et al. ................. 222/638 |
| 4,059,181 | A | * | 11/1977 | Greenfield et al. .......... 194/242 |
| 4,211,342 | A | * | 7/1980  | Jamgochian et al. ..... 222/129.4 |

(Continued)

FOREIGN PATENT DOCUMENTS

DE                3 03 8726         5/1981

(Continued)

OTHER PUBLICATIONS

Abstract of Japanese Patent No. JP2003006732.

*Primary Examiner*—Kevin P Shaver
*Assistant Examiner*—Andrew P Bainbridge
(74) *Attorney, Agent, or Firm*—K&L Gates LLP (57) ABSTRACT

Methods and systems to deliver foamed beverages from liquid concentrate(s) through a dispenser machine are presented. In an embodiment, the method and system for improving foam quality by generating foam with the desired texture, stability and bubble size distribution comprises use of a low viscous liquid(s) to generate a primary foam, which is then stabilized by mixing it with liquid(s) of higher viscosity. To create high quality foam, different dosing protocols including two approaches such as delivery of foaming liquid concentrates at different concentration, or getting different concentration by varying water dosing times and/or flow rates were used. Positive results were found for the dispensing systems using milk and other liquid concentrates at specific dispensing conditions (flow rates and times).

25 Claims, 10 Drawing Sheets

U.S. PATENT DOCUMENTS

| | | | |
|---|---|---|---|
| 4,305,328 A * | 12/1981 | Kueser et al. | 99/283 |
| 4,388,338 A * | 6/1983 | Wittenborg | 426/590 |
| RE31,352 E * | 8/1983 | Kueser et al. | 99/283 |
| 4,517,651 A * | 5/1985 | Kawasaki et al. | 700/239 |
| 4,815,633 A * | 3/1989 | Kondo et al. | 222/129.4 |
| 4,903,585 A * | 2/1990 | Wimmers et al. | 99/275 |
| 4,903,862 A * | 2/1990 | Shannon et al. | 222/54 |
| 5,375,508 A * | 12/1994 | Knepler et al. | 99/280 |
| 5,650,186 A * | 7/1997 | Annoni et al. | 426/231 |
| 5,803,320 A * | 9/1998 | Cutting et al. | 222/641 |
| 5,927,553 A * | 7/1999 | Ford | 222/129.4 |
| 5,947,334 A * | 9/1999 | Rudick et al. | 222/129.2 |
| 5,952,032 A | 9/1999 | Mordini et al. | |
| 6,148,717 A * | 11/2000 | Lassota | 99/283 |
| 6,240,829 B1 * | 6/2001 | McGarrah | 99/275 |
| 6,305,269 B1 * | 10/2001 | Stratton | 99/323.1 |
| 6,419,120 B1 * | 7/2002 | Bertone | 222/129.4 |
| 6,689,410 B2 * | 2/2004 | Gerber | 426/565 |
| 6,726,950 B2 * | 4/2004 | Yuzawa | 426/569 |
| 7,044,336 B2 * | 5/2006 | Bertone | 222/129.4 |
| 7,047,870 B2 * | 5/2006 | Gantt et al. | 99/305 |
| 7,225,728 B2 * | 6/2007 | Lyall, III | 99/299 |
| 7,226,631 B2 * | 6/2007 | Thakur et al. | 426/477 |
| 2004/0129725 A1 * | 7/2004 | Bertone | 222/129.4 |
| 2005/0127098 A1 * | 6/2005 | Bertone | 222/129.1 |
| 2006/0045942 A1 * | 3/2006 | Sher et al. | 426/115 |
| 2006/0115570 A1 * | 6/2006 | Guerrero et al. | 426/590 |
| 2006/0115572 A1 * | 6/2006 | Guerrero et al. | 426/597 |
| 2006/0175351 A1 * | 8/2006 | Reddy et al. | 222/145.5 |
| 2008/0020115 A1 * | 1/2008 | Guerrero et al. | 426/533 |

FOREIGN PATENT DOCUMENTS

| | | |
|---|---|---|
| EP | 104 447 | 4/1984 |
| EP | 1 116 464 | 7/2001 |
| GB | 2 019 813 | 11/1979 |
| GB | 2 063 515 | 6/1981 |
| GB | 2 137 520 | 10/1984 |

* cited by examiner

METHODS AND SYSTEMS FOR DELIVERING FOAMED BEVERAGES FROM LIQUID CONCENTRATES

BACKGROUND OF THE INVENTION

The present invention generally relates to beverages. More specifically, the present invention relates to methods and systems for dispensing foamed beverages.

Foam quality (e.g. stability, stiffness and appearance over time) and amount are important parameters for Cappuccino type beverages. Many believe that the best quality foam is created by hand, for example, in coffee shops and derives from frothing fresh milk by steam injection. A shot of express coffee is added to hot milk, and the foam is gently poured on top of the liquid part. The result is dense, stiff and stable foam with small bubble size distribution. However, this method of producing foam requires an experienced operator and also relatively long times to be accomplished. Further, because of preparation by hand, the consistency of the final products is strongly related to the operator's skills. Consequently, there is a need for a methods and equipment that can be easily be used to generate high quality foamed beverages.

U.S. Pat. No. 2,949,993 "Carbonated Coffee Beverage Dispenser" describes an apparatus that dispenses cold carbonated coffee beverages with desired crème on top. The liquids are delivered in a dispensing head where they are mixed and finally put in a cup. The patent claims that "to ensure that a proper crème is formed on top of each beverage, different dispensing sequences are required for each combination." Numerous recipes are said to have been developed, but no information about the flow rates, dosing sequences or times are provided. The disadvantage of this patent is that it does not apply to Cappuccino type beverage foam, and no reference is made on foam quality and stability over time.

U.S. Pat. No. 4,388,338 "Method for Preparing Beverages in Portions" relates to a method for preparing a beverage in a vending machine. A premeasured amount of flavored powder is added in the cup. Two different streams of water are sent into the cup simultaneously. One stream of water is at high pressure and low flow rate, and a second stream has a lower pressurized water (slight overpressure) and higher flow rate. A final shower of water can by sprayed over the foamed beverage for rinsing down and dissolving any grains of flavored powder. Nevertheless, this patent fails to show the delivery of a beverage liquid at different viscosities (e.g. different product component-to-diluent ratios) during dispensing to improve foam or reduce delivery time.

U.S. Pat. No. 4,903,585 "Dispensing Coffee Having a Foamed Appearance" describes an apparatus for producing and dispensing a coffee from spray dried powders, with a thick layer of stable foam. The method of using the apparatus consists in creating the foam using a limited amount of cold water in the mixing chamber upon vigorous agitation (thus forming a foamed liquid coffee concentrate) and diluting the beverage with hot water without disrupting the foam. A disadvantage of this patent is that the process is not continuous because the foamed cold liquid concentrate needs to be diluted with hot water in the correct ratio before dispensing the beverage and therefore the delivery time might be sacrificed. Further, the hot water needs to be dispensed tangentially along the sidewalls of the mixing chamber to break the surface tension of the foam on the sidewalls and also the foam is not applicable for Cappuccino type beverages.

U.S. Pat. No. 5,803,320 "Carbonated Coffee Beverage Dispenser" describes a soda and coffee extract that are dispensed through the entire dispensing process. The improvement of the creme is largely caused by the soda and bicarbonation level of the soda. However, soda is undesirable in coffee based products because it gives an undesirable sparkling effect. This patent is also silent as to how the control of the ratio cycle is achieved for improving the foam or reducing delivery time.

There is therefore a need to provide methods and systems for producing a foam having an improved quality in a short period of time.

SUMMARY OF THE INVENTION

The present invention relates to methods and systems for improving foam quality from liquid and powder concentrates. The present invention also relates to methods and systems for producing an improved foam quality from liquid and powder concentrates in a shorter period of time than conventional processes.

In an embodiment, the present invention provides a method for producing a foamed beverage, the method comprising: dosing at least one product component at a first concentration; dosing a diluent; combining the product component and diluent together to form a mixture; and mixing the mixture to form the foamed beverage, wherein the dosing of the product component and diluent is controlled so that the product component concentration in the diluent increases during at least one cycle of combining and mixing.

In an embodiment, the mixing comprises whipping.

In an embodiment, the product component is a liquid and the concentration of the product component is increased by increasing a flow rate of the liquid relative to a diluent flow rate.

In an embodiment, the liquid flow rate increases during a preparation cycle and the diluent flow rate remains substantially constant or decreases.

In an embodiment, the liquid flow rate increases stepwise.

In an embodiment, the liquid flow rate remains substantially constant and the diluent flow rate decreases.

In an embodiment, the liquid flow rate remains substantially constant and the diluent flow rate intermittently stops for at least 1 second.

In an embodiment, the method comprises at least two separate steps lasting at least 2 seconds each.

In an embodiment, the liquid flow rate is adjusted by a controller and a pump.

In an embodiment, the product component is a powder and a concentration of component-to-diluent is increased by increasing a dosing speed of the powder.

In an embodiment, the dosing speed is increased stepwise.

In an embodiment, the powder is dosed by a volumetric screw or auger driven by an electric motor having a speed controlled by a controller.

In an embodiment, a diluent flow rate can be controlled by an active pressure valve or a pump.

In an embodiment, the product component comprises a foaming component selected from the group consisting of dairy creamers, milk concentrates, milk powders, whey proteins, non-dairy creamers, non-dairy fats, non-dairy oils, premixes having foaming agents and non-foaming components, emulsifiers and combinations thereof.

In an embodiment, the product component includes a non-foaming component selected from the group consisting of coffees, cocoas, sweeteners, preservatives, flavorings, colorings, nutritional ingredients and combinations thereof.

In an embodiment, the beverage is produced by mixing one or more additional product components from another source.

In an embodiment, the product component is maintained in chilled or shelf stable conditions.

In an embodiment, the whipping is performed in a standard rotary whipping device in a range between about 10,000 to 15,000 r.p.m.

In an embodiment, the whipping is achieved by jets streams.

In an embodiment, the diluent is water.

In another embodiment, the present invention provides a system for producing foamed beverages, the system comprises: a first dispenser for dosing at least one product component at a first concentration; a second dispenser for dosing a diluent; and a whipper for combining and whipping the product component and diluent together to form the foamed beverage, wherein the dosing of the product component and diluent is controlled by a controller so that the product component concentration in the diluent increases during at least one cycle of mixing and whipping.

In an embodiment, the system comprises an active pressure valve or a pump to control a diluent flow rate.

In an embodiment, the system comprises a volumetric screw or auger driven by an electric motor having a speed controlled by a controller to dose the powder.

An advantage of the present invention is to provide methods and systems for generating hot, ambient and cold beverages based on foam generation from liquid concentrate(s) based on dosing sequence and/or ingredient flow rates.

Another advantage of the present invention is to deliver quality foam beverages in a fast and hygienic way with only possible minor modifications of equipment.

Still another advantage of the present invention is to deliver quality foam beverages in an automated and reproducible way with only possible minor modifications of equipment.

Yet another advantage of the present invention is to provide foam having improved qualities such as longer stability, mouthfeel and texture. For example, consumers may enjoy a stiffer foam for a longer period of time.

An advantage of the present invention is to provide a shorter delivery time for producing improved quality foam without comprising in-cup beverage quality. For example, this could allow operators to prepare and serve more cups per minute.

Another advantage of the present invention is to allow operators to customize or control foam qualities such as amount, texture, uniform bubble distribution so they can readily provide beverage with foam properties according to consumer preferences.

Still another advantage of the present invention is to improve foaming quality of products without reformulation or changing processing conditions during manufacturing.

Yet another advantage of the present invention is to provide a closed dispensing system for liquid concentrates.

Additional features and advantages of the present invention are described in, and will be apparent from, the following Detailed Description of the Invention and the figures.

DETAILED DESCRIPTION OF THE INVENTION

The present invention is relates to methods and systems for producing improved foamed beverages. In an embodiment, the present invention provides methods and systems for generating improved quality foamed beverages by changing the dosing sequence and rate of ingredient addition thereby requiring no major modification of the existing equipment. For example, the beverages may be based on improved foam generating using powder or liquid concentrate(s) with a lower viscosity/concentration and foaming agent concentration and further stabilization of the created foam by mixing with powder or liquid concentrate(s) having a higher viscosity/concentration.

In an embodiment, foaming may be performed by increasing concentrations of the foaming product component in the diluent (e.g. water) during the continuous preparation cycle (e.g. mixing-whipping cycle) in a dispensing system. For example, a low concentration of the product component at the beginning of the cycle promotes the generation of bubbles followed by a higher product concentration to stabilize the created foam. The method and system may also be used to reduce the delivery time to produce foamed beverages dispensed from dispensing systems.

In another embodiment, the method for preparing foamed beverages is based on a specific dispensing protocol using a dispenser suitable for use with powder or liquid concentrates or components. Shelf-stable liquid concentrates can be, for example, milk, coffee, chocolate, non-dairy creamer, premixes or any other suitable liquid concentrates. The liquid concentrates are delivered in to a mixing chamber by a pump means where they are mixed with water having a temperature between 2-99° C. The dosing (e.g. addition in specified amounts) of all ingredients can be varied, for example, by changing rate, concentration or amount via controlling the pump settings. The mixing chamber connects to a whipper bowl and a dispensing nozzle. According to the production formulation and specifications, the whipper can be turned on to generate foamed beverages. Whippers having different designs (e.g. conical, vane, disk, etc.) with an r.p.m. range of 0-40,000 can be used. Preferably, the r.p.m. should be between 10,000 and 15,000.

It was surprisingly found that dosing the milk concentrate at a lower flow rate in the first part of the sequence and adding the remaining portion of the concentrate in the second part of the sequence helped increase foam stiffness and stability over time. Several factors such as delivery rate and flow velocity of water and liquid concentrates, dosing sequence and viscosity of concentrates were found to play important roles in creating foamed beverages.

Interrelation between the flow rates of water and milk liquid concentrate is important for foaming. It was surprising found that by decreasing the milk flow rate at the beginning of the foaming sequence and adding the remaining amount in a second step resulted in the generation of stiffer and more stable foam lasting for a longer time. The foam appearance was also improved, and smaller and more homogenously distributed bubbles were generated.

For the foaming baseline of a Cappuccino, for example, milk concentrate was dosed with a milk to water flow rate ration of 0.54:1. Milk to water flow rate ratios in the range of 0.47:1 and 0.60:1 gave similar results to the baseline. Increasing the ratio above 0.60:1 (milk flow rate greater than 9.75 g/s) created less foam. Milk to water flow rate ratios below 0.30:1 gave worse results (e.g. lower stiffness and less foam) than the baseline. Based on in-cup quality of foam (stability, stiffness and bubble size distribution), the flow rate ratio of concentrate #1 with 30% TS (e.g. milk) to water should be between 0.30:1 to 0.60:1, preferably from 0.33:1 and 0.50:1 and most preferably from 0.37:1 and 0.47:1.

Water flow rate was also found important in an embodiment for producing improved foams. Keeping the milk flow rate constant and diluting the milk by increasing the water flow rate can improve the foam quality. Concentrating the milk at the first step by decreasing the water flow rate to get concentrate with water ratio from 0.45:1 to 0.62:1 results in less foam than the baseline.

It was also found that very high flow rate decreases foam amount, which was surprising because generally more turbulence that is created in a cup usually generates a higher amount of foam. However, it was found that high flow velocity resulted in creating high in-cup turbulence that formed a higher number of large and unstable bubbles that lead to the lower stability of the foam. It was confirmed that the most preferable conditions for foam quality can be achieved with milk to water flow ratios in the range of 0.37:1 and 0.47:1.

To vary the dosing setting parameters, the milk flow rate should be controlled by means of a pump that doses the milk at different flow rates. For example, if the water flow rate is determined by pressure, the water can be cycled thus increasing or decreasing the foaming agent concentration. This new method does not require any modification of whipper system design and could also be applied to whipperless systems.

To decrease the delivery time of beverages, the flow rate of ingredients may be increased. It was found that an increase in water flow rate from 18 to 25 g/s led to a decrease in foam amount, stiffness and bubble size distribution (Example 5). It was surprisingly found that by adjusting the milk to water flow ratio within the range of 0.37:1 and 0.47:1 and foaming the milk at a lower concentration in the first step resulted in a foam quality similar to the baseline. Thus, this demonstrates that the present method allows foam quality to be maintained while the delivery time is significantly decreased. For example, the delivery time can be decreased by approximately 20-25% (e.g. from 18 to 14 seconds for a 16-oz cup).

Different types of milk concentrate (milk source, processing condition and composition) were also tested. It was found that foam stability up to 10 minutes could be improved more than 10-15% by dosing the ingredients at a specific sequence.

It should be appreciated that the liquids that can be used to create foam are not limited to a milk base concentrate. For example, liquid concentrate pre-mixes containing foaming agents were mixed with water at high motor speeds of 15,000 r.p.m. It was surprisingly found that by decreasing the concentrate to water ratio from 0.26:1 to 0.19:1 and by adding the remaining amount of concentrate at a ratio of 0.38:1 resulted in an improved foam amount of approximately 10% after 1 minute and 30% after 5 minutes.

When evaluating a different non-dairy concentrate, it was surprisingly found that diluting the concentrate and thus reducing initial concentrate viscosity produced less foam than the baseline. It was found that the concentration of foaming agent in-cup was below 0.4%. For positive results, the in-cup concentration of foaming agent may vary from 0.4 to 20%, preferably from 2 to 5%. Thus, concentration of foaming agent in the liquid concentrate was found to be significant.

In an embodiment, the method for producing a foamed beverage, for example, through a dispensing system comprises: dosing at least one product component at a first concentration; dosing a diluent; combining the product component and diluent together to form a mixture; and mixing the mixture to form the foamed beverage, wherein the dosing of the product component and diluent is controlled so that the product component concentration in the diluent increases during at least one cycle of combining and mixing. The diluent may be water. The mixing may comprise whipping during or after the mixing occurs. For example, the whipping may be performed in a standard rotary whipping device in a range between about 10,000 to 15,000 r.p.m. The whipping may also be achieved by jets streams.

The product component may be, for example, a liquid and the concentration of the product component is increased can be increased in various ways. One way is by increasing a flow rate of the liquid relative to a diluent flow rate. The liquid flow rate is adjusted, for example, by a controller and any suitable pump such as a peristaltic pump. The diluent flow rate can be also controlled, for example, by an active pressure valve or a pump. The liquid flow rate may increase during a preparation cycle and the diluent flow rate remains substantially constant or decreases. The liquid flow rate may also increase stepwise.

The concentration of the component may also increase if liquid flow rate remains substantially constant and the diluent flow rate is decreased. In an embodiment, the liquid flow rate may remain substantially constant and the diluent flow rate intermittently stops for at least 1 second. In another embodiment, the method comprises at least two separate steps lasting at least 2 seconds each related to any of the aforementioned methods.

The product component may also be, for example, a powder and a concentration of component-to-diluent is increased by increasing a dosing speed of the powder. The dosing speed may increased stepwise. The powder may be dosed, for example, by a volumetric screw or auger driven by an electric motor having a speed controlled by a controller.

The product component may also comprise, for example, any suitable foaming component such as, for example, dairy creamers, milk concentrates, milk powders, whey proteins, non-dairy creamers, non-dairy fats, non-dairy oils, premixes having foaming agents and non-foaming components, emulsifiers and combinations thereof.

The product component may include, for example, any suitable non-foaming component such as, for example, coffees, cocoas, sweeteners, preservatives, flavorings, colorings, nutritional ingredients and combinations thereof. In addition, the beverage may be produced by mixing one or more additional product components from another source. The product component(s) may also be maintained in chilled or shelf stable conditions.

Figure 1:
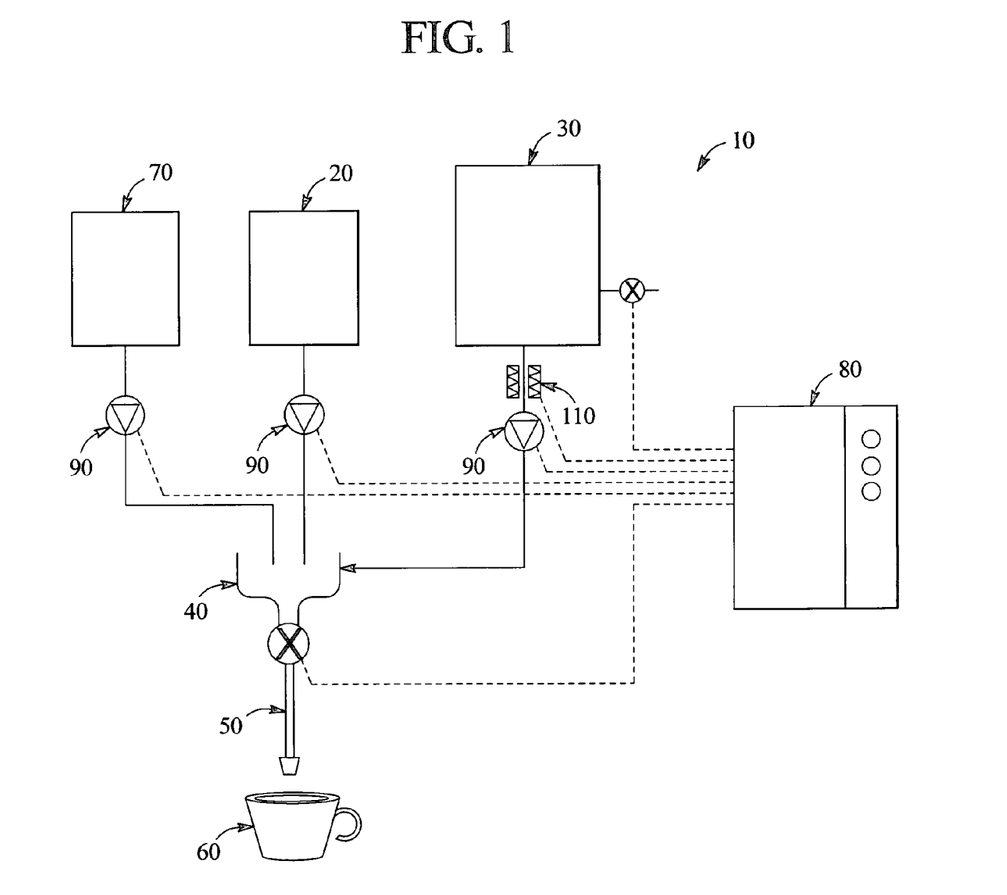
FIG. 1 is a schematic illustrating the system for producing a foamed beverage in one embodiment of the present invention.
Figure 2:
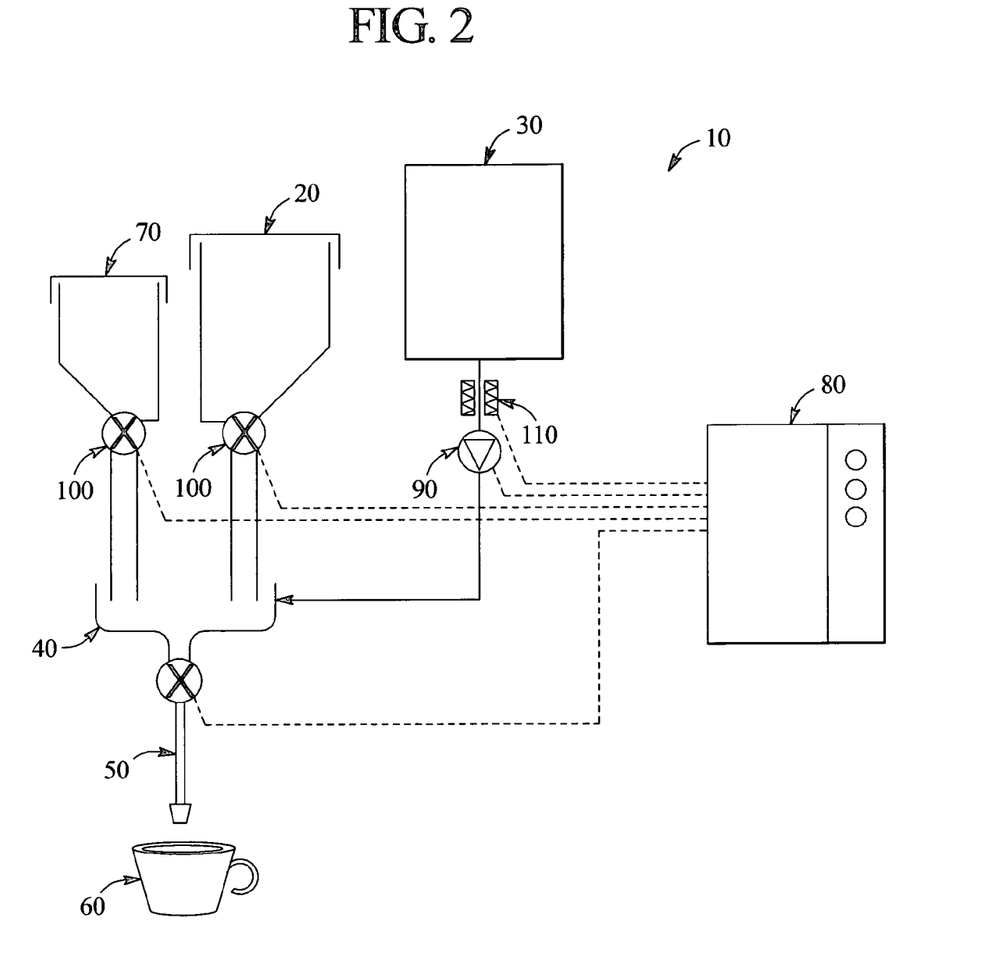
FIG. 2 is a schematic illustrating the system for producing a foamed beverage in one embodiment of the present invention.

In another embodiment illustrated in FIGS. 1 and 2, the apparatus or system 10 generally comprises: a first dispenser 20 for dosing at least one product component at a first concentration; a second dispenser 30 for dosing a diluent; and a mixing device or whipper 40 for combining and whipping the product component and diluent together to form the foamed beverage, wherein the dosing of the product component and diluent is controlled so that the product component concentration in the diluent increases during at least one cycle of mixing and whipping. The system 10 may also comprise a third dispenser 70 (or additional dispensers) for dispensing one or more additional product components at another concentration. It should be appreciated that each of the dispensers may be any suitable storage and dispensing unit capable of holding and dispensing a liquid or powder product component.

The mixing device or whipper 40 may comprise a bowl or any suitable apparatus for holding and mixing liquids. The whipper 40 may also comprise a dispensing nozzle 50 for dispensing the foamed liquid into a container 60. It should be appreciated that the apparatus or system 10 may be any size or configuration suitable for producing an improved foamed beverage.

For liquid foaming components as illustrated in FIG. 1, the system 10 may comprise, for example, a controller 80 and one or more suitable pumps 90, such as peristaltic pumps, for adjusting the diluent and product component(s) dosing. The system 10 may also comprise, for example, an active pressure valve or a pump 90 to control a diluent flow rate. For powdered foaming components as illustrated in FIG. 2, the system may comprise, for example, a volumetric screw or auger 100 driven by an electric motor (not shown) having a speed controlled by a controller 80 to dose the powder. The system 10 may also comprise a heater 110 for heating the diluent and/or the liquid product components. It should be appreciated that liquid product dispensers and powder product dispensers can be combined in the same system 10 in an embodiment to achieve the improved foamed beverage.

EXAMPLES

By way of example and not limitation, the following examples are illustrative of various embodiments of the present invention and further illustrate experimental testing conducted in accordance with embodiments of the present invention. In the following examples, the milk concentrate contains approximately 28% total solids and has a viscosity between 12 and 17 cP, the non-dairy creamer contains approximately 72% total solids and has a viscosity of 600 cP, and the liquid concentrate pre-mixes contain approximately 45% total solids and have a viscosity of 200 cP.

Example 1

Baseline

Figure 5:
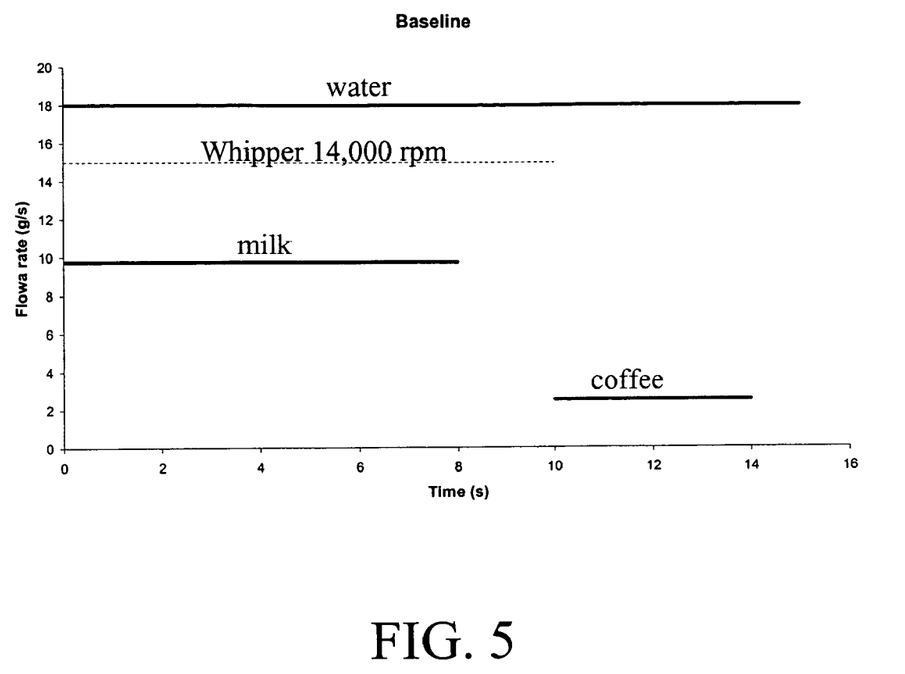
FIG. 5 is a graph illustrating the dosing setting of Cappuccino base from Example 1.

A Cappuccino type beverage was prepared using a dispenser system from milk and coffee concentrates. As illustrated in FIG. 5, a Cappuccino (reference) was prepared using the following procedure:

water flowrate of 18 g/s, dosing time from 0 to 15 s;

milk concentrate flow rate of 9.75 g/s, dosing time from 0 to 8 s;

coffee concentrate flow rate of 2.5 g/s, dosing time from 9 to 12 s.

Figure 3:
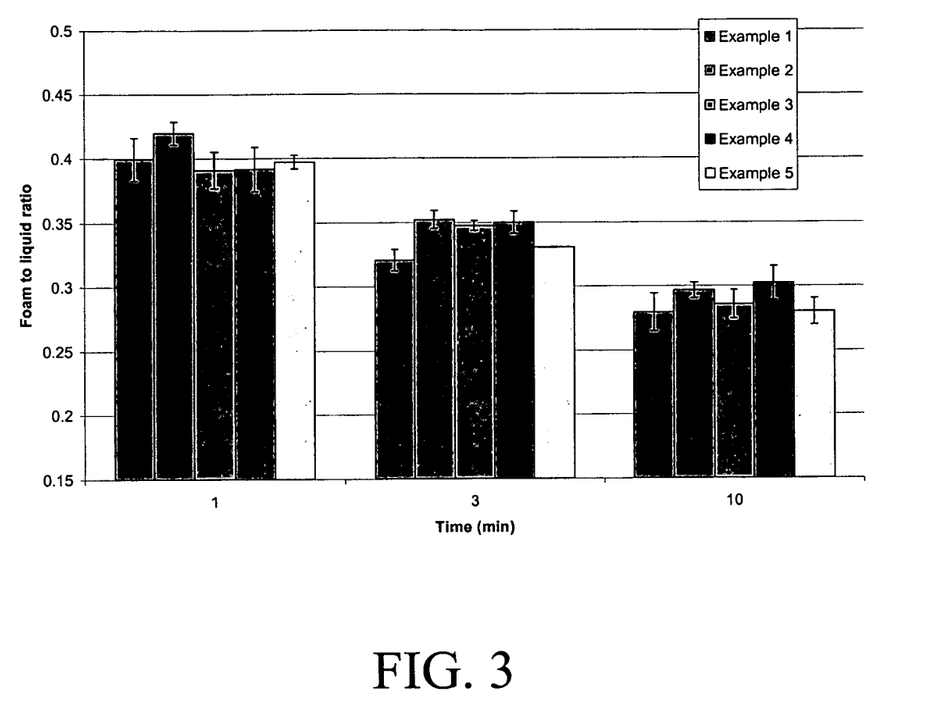
FIG. 3 is a graph illustrating Foam to Liquid Ratios (FLR) from different Examples versus time.
Figure 4:
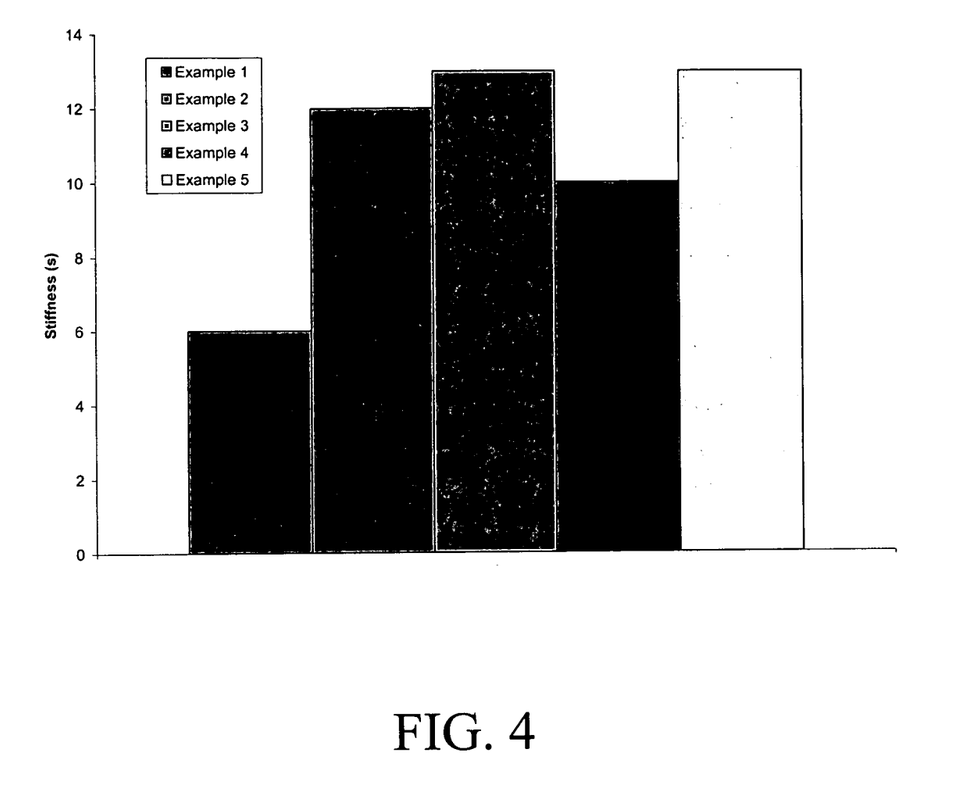
FIG. 4 is a graph illustrating the stiffness of foam from different Examples.

Disk whipper (at 14,000 r.p.m.) was in on-mode from 0 to 10 s. The Foam to Liquid Ratio (FLR) determined after 1 minute was 0.39, FLR after 3 minutes was 0.32 and FLR after 10 minutes was 0.27 as shown in FIG. 3. The foam stiffness was measured after 2 minutes from dispensing by using plastic spheres of known density and diameter. One sphere was gently placed on the surface of foam in the cup, and the time taken to disappear was monitored. The foam stiffness was found to be 6±1 sec as illustrated in FIG. 4. The total delivery time was found to be 18 s.

Example 2

Foam Stability and Stiffness

Figure 6:
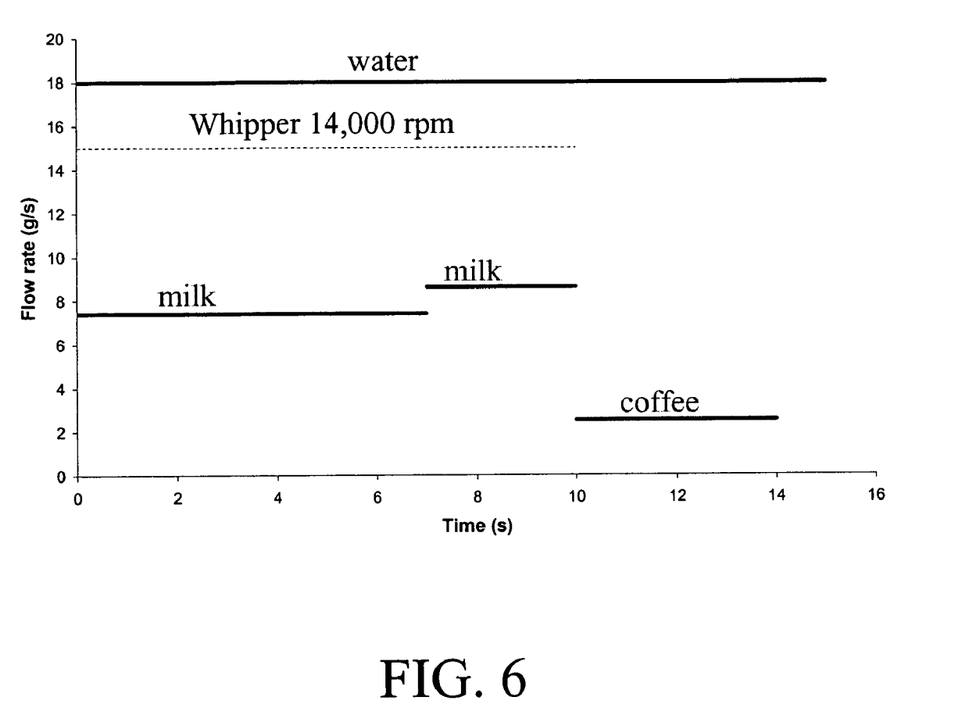
FIG. 6 is a graph illustrating the dosing setting of Example 2.

To improve foam quantity and stability, a cappuccino beverage was prepared using a dispensing system as in Example 1, but milk flow rate was decreased from 9.75 g/s to 7.4 g/s from 0 to 7 s and increased to 8.6 g/s from 7 to 10 s as shown in FIG. 6. Water flow rate and whipper time were kept constant. FLR data and foam stiffness are presented in FIGS. 3 and 4. Approximately 18% and 15% improvements over the baseline in amount of foam was found after 3 and 10 minutes, respectively.

Example 3

Foam Stability and Stiffness

Figure 7:
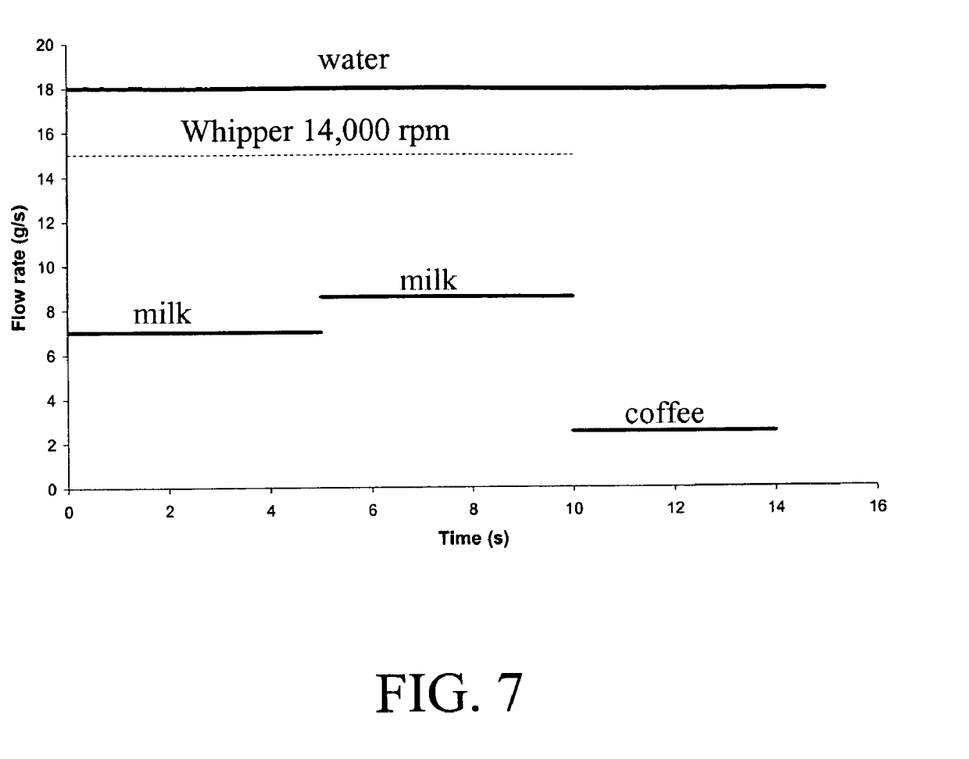
FIG. 7 is a graph illustrating the dosing setting of Example 3.

To improve foam quantity and stability, a Cappuccino beverage was prepared using a dispensing system as in Example 1, but milk flow rate was decreased from 9.75 g/s to 7 g/s from 0 to 5 s and increased to 8.6 g/s from 5 to 10 s as shown in FIG. 7. Water flow rate and whipper time were kept constant. The FLR determined after 1 minute was 0.42, after 3 minutes was 0.37 and after 10 minutes was 0.31. Approximately 18% and 15% improvements over the baseline in amount of foam was found after 3 and 10 minutes, respectively. Foam stiffness was also improved over the baseline from 6±1 to 13±1 s.

Example 4

Foam Stability and Stiffness

Figure 8:
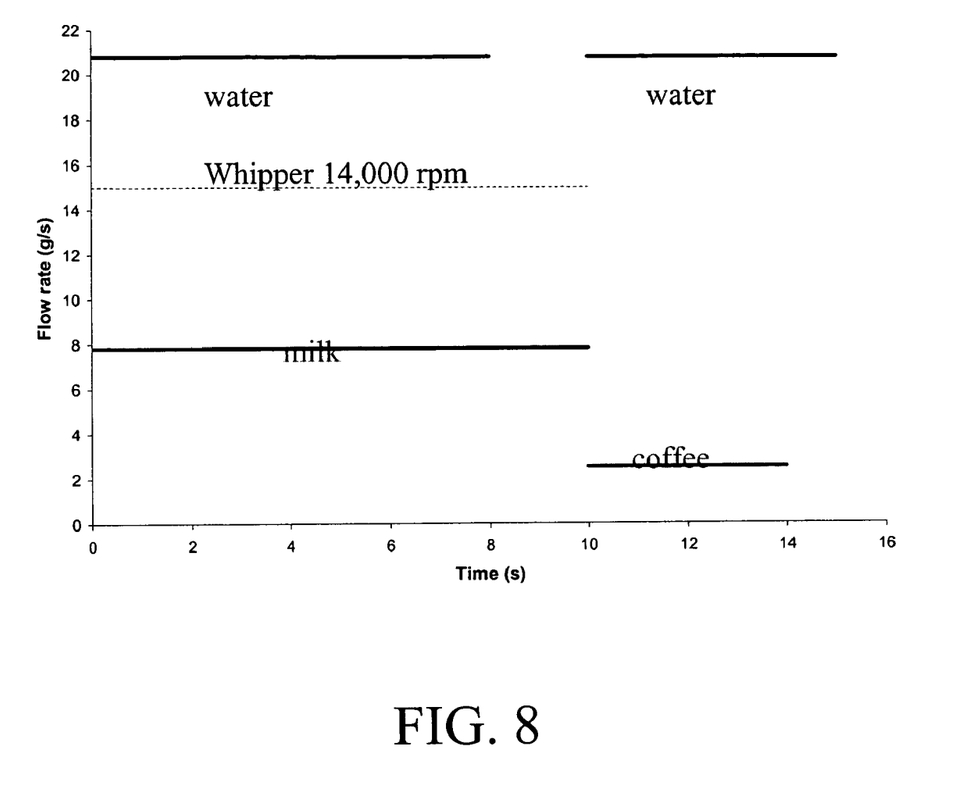
FIG. 8 is a graph illustrating the dosing setting of Example 4.

To improve foam stiffness, a Cappuccino beverage was prepared using a dispensing system as in Example 1, but water flow rate was cycled twice from 0 to 8 s and from 10 to 15 s at an increased flow rate of 20.8 g/s (from the baseline of 18 g/s) as shown in FIG. 8. Milk flow rate and whipper time were kept constant. The FLR determined after 1 minute was 0.39±0.02, after 3 minutes was 0.34±0.01 and after 10 minutes was 0.30±0.01. Foam stiffness was also improved over the baseline from 6±1 to 12±1 s. The relevant data is presented in FIGS. 3 and 4.

Example 5

Foam Stability and Stiffness

Figure 9:
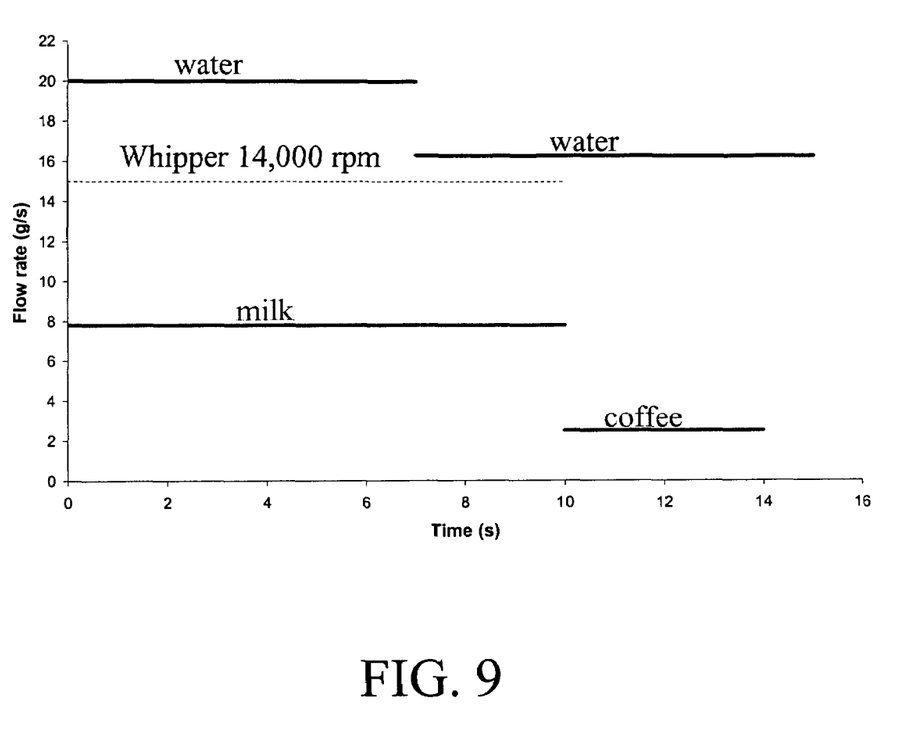
FIG. 9 is a graph illustrating the dosing setting of Example 5.

To improve the delivery time of beverages, a Cappuccino beverage was prepared using a dispenser as in Example 1, but water flow rate was increased from 18 g/s (baseline) to 20 g/s from 0 to 7 s and decreased further to 16.3 g/s from 7 to 15 s as shown in FIG. 9. Milk flow rate was reduced to 7.8 g/s from 0 to 10 s, and whipper time was kept constant. The FLR was found to be similar to the baseline. Foam stiffness was improved over the baseline from 6±1 to 12±1 s. The delivery time was reduced to 16 s. The relevant data is presented in FIGS. 3 and 4.

Example 6

Delivery Time

A Cappuccino beverage was prepared using a dispensing system as in Example 1, but water flow rate was increased from 18 g/s (baseline) to 25 g/s from 0 to 10.8 s. Milk flow and whipper time were kept constant. The FLR determine after 1 minute was 0.35±0.02, after 3 minutes was 0.29±0.01 and after 10 minutes was 0.24±0.01. Foam stiffness was found to be 4±1. The delivery time was reduced to 14 s.

Example 7

Delivery Time

Figure 10:
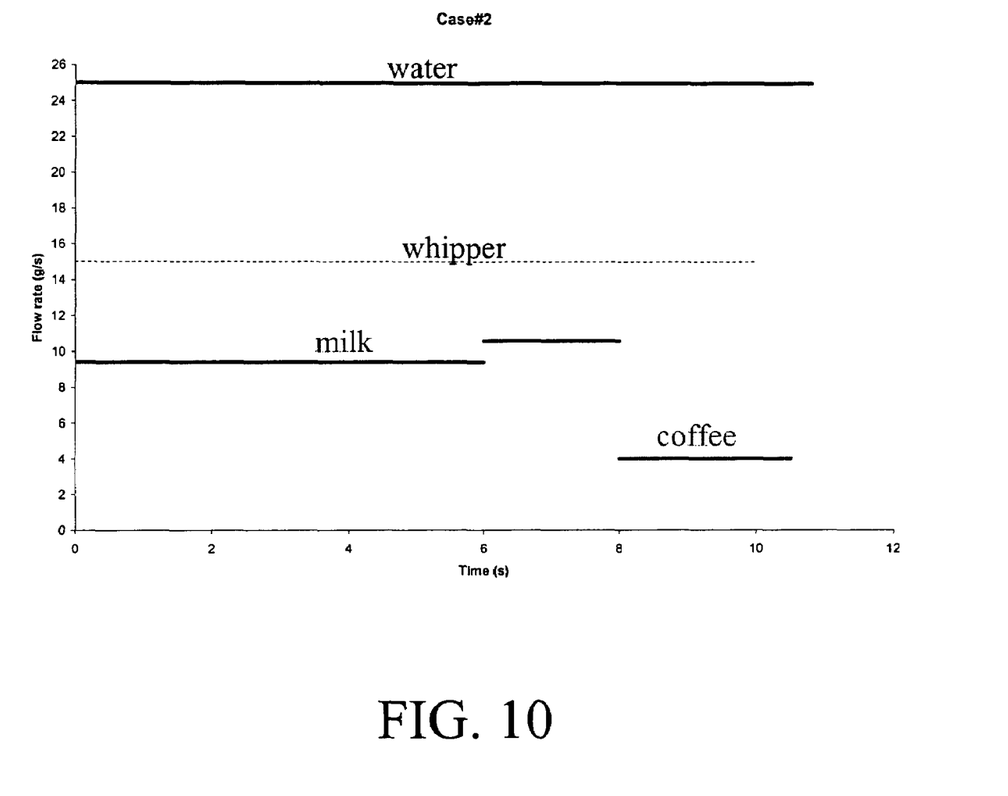
FIG. 10 is a graph illustrating the dosing setting of Example 7.

A Cappuccino beverage was prepared using a dispensing system as in Example 1, but water flow rate was increased from 18 g/s (baseline) to 25 g/s from 0 to 10.8 s. Milk was dosed at 9.4 g/s from 0 to 6 s and at 10.6 g/s from 6 to 8 s as shown in FIG. 10. The whipper time was kept constant. The FLR determine after 1 minute was 0.34±0.02, after 3 minutes was 0.29±0.01 and after 10 minutes was 0.25±0.01. Foam stiffness was found to be 6±1. The delivery time was reduced to 14 s. Accordingly, it was demonstrated that, by cycling the milk and reducing the delivery time, the foaming properties of the milk were not changed.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method for producing a foamed beverage, the method comprising:
    dosing at least one product component at a first concentration;
    dosing a diluent;
    combining the product component and diluent together to form a mixture; and
    mixing the mixture to form the foamed beverage, wherein the dosing of the product component and diluent is controlled so that the product component concentration in the diluent increases during at least one cycle of combining and mixing, wherein the product component concentration is increased by a step selected from the group consisting of increasing a rate of introduction of the product component during dosing of the product component, decreasing a rate of introduction of the diluent during dosing of the diluent, and combinations thereof.

2. The method of claim 1, wherein the mixing comprises whipping.

3. The method of claim 1, wherein the product component is a liquid and the concentration of the product component is increased by increasing a flow rate of the liquid relative to a flow rate of the diluent.

4. The method of claim 3, wherein the liquid flow rate increases during a preparation cycle and the diluent flow rate is selected from the group consisting of substantially constant, decreases and combinations thereof.

5. The method of claim 3, wherein the liquid flow rate increases stepwise.

6. The method of claim 3, wherein the liquid flow rate remains substantially constant and the diluent flow rate decreases.

7. The method of claim 3, wherein the liquid flow rate remains substantially constant and the diluent flow rate intermittently stops for at least 1 second.

8. The method of claim 3 comprising at least two separate steps lasting at least 2 seconds each.

9. The method of claim 3, wherein the liquid flow rate is adjusted by a controller and a pump.

10. The method of claim 1, wherein the product component is a powder and a concentration of component-to-diluent is increased by increasing a dosing speed of the powder.

11. The method of claim 10, wherein the dosing speed is increased stepwise.

12. The method of claim 10, comprising at least two separate steps lasting at least 2 seconds each.

13. The method of claim 10, wherein the powder is dosed by a device selected from the group consisting of a volumetric screw, auger and combinations thereof, wherein the device is driven by an electric motor having a speed controlled by a controller.

14. The method of claim 1, wherein a diluent flow rate can be controlled by a device selected from the group consisting of an active pressure valve, pump and combinations thereof.

15. The method of claim 1, wherein the product component comprises a foaming component selected from the group consisting of dairy creamers, milk concentrates, milk powders, whey proteins, non-dairy creamers, non-dairy fats, non-dairy oils, premixes having foaming agents and non-foaming components, emulsifiers and combinations thereof.

16. The method of claim 15, wherein the product component includes a non-foaming component selected from the group consisting of coffees, cocoas, sweeteners, preservatives, flavorings, colorings, nutritional ingredients and combinations thereof.

17. The method of claim 1, wherein the beverage is produced by mixing at least one additional product components from another source.

18. The method of claim 1, wherein the product component is maintained in a condition selected from the group consisting of chilled, shelf-stable and combinations thereof.

19. The method of claim 2, wherein the whipping is performed in a standard rotary whipping device in a range between about 10,000 to 15,000 r.p.m.

20. The method of claim 2, wherein the whipping is achieved by jets streams.

21. The method of claim 1, wherein the diluent is water.

22. A system for producing a foamed beverage, the system comprising:
    a first dispenser capable of dosing at least one product component at a first concentration;
    a second dispenser capable of dosing a diluent; and
    a whipper for mixing and whipping the product component and diluent together to form the foamed beverage, wherein the dosing of the product component and diluent is controlled by a controller so that the product component concentration in the diluent increases during at least one cycle of mixing and whipping, wherein the product component concentration is increased by a step selected from the group consisting of increasing a rate of introduction of the product component during dosing of the product component, decreasing a rate of introduction of the diluent during dosing of the diluent, and combinations thereof.

23. The system of claim 22, wherein the product component is a liquid and the concentration of the product component is increased by increasing a flow rate of the liquid relative to a flow rate of the diluent.

24. The system of claim 23, wherein the liquid flow rate increases during a preparation cycle and the diluent flow rate is selected from the group consisting of substantially constant, decreases and combinations thereof.

25. The system of claim 22, wherein the product component is a powder and a concentration of component-to-diluent is increased by increasing a dosing speed of the powder.

* * * * *